United States Patent Office 2,833,700
Patented May 6, 1958

---

2,833,700

RESOLUTION OF MIXTURES OF HYDROGEN IODIDE, WATER, AND IODINE

Herman J. Baumgartner, Danville, and Charles M. Gable, Lafayette, Calif., assignors to Shell Development Company, New York, N. Y., a corporation of Delaware No Drawing. Application February 21, 1957
Serial No. 641,461

18 Claims. (Cl. 202—40)

This invention relates to a process for resolving mixtures of hydrogen iodide, water and iodine. More particularly, this invention relates to a process for concentrating dilute solutions of hydrogen iodide and iodine in water by removing water therefrom, and to a method for recovering the iodine in the resulting concentrated solutions.

The art provides no direct method for resolving a dilute solution of hydrogen iodide and iodine in water. We have discovered, however, that a large part of the water in such a dilute solution can be removed by fractionally distilling the solution in a rectification zone wherein there is maintained in the liquid phase in that part of the zone above the point at which the dilute solution enters, an iodide ion concentration of at least 15% by weight, on an iodine-free basis. When a solution of hydrogen iodide and iodine in water is distilled under these conditions, the overhead product is substantially pure water, while the bottoms product is a concentrated solution of the hydrogen iodide and iodine in the remaining water.

It appears that when a dilute solution of hydrogen iodide and iodine in water is fractionally distilled, the hydrogen iodide does not rise to any substantial extent in the rectification zone above the point at which the dilute solution enters that zone, but that both water and iodine vapors pass upwards in that zone above the point at which the feed enters it. We have found that when an iodide ion concentration of at least 15% by weight, on an iodine-free basis, is maintained in the liquid phase in the rectification zone above the point at which the feed enters it, by addition of a compound which ionizes to give free iodide ion in aqueous solution, the iodine vapors no longer pass upward through the rectification zone, but pass with the liquid phase downward through that zone to be recovered as bottoms product. The water vapors continue to pass upward through the rectification zone and are recovered as the overhead product.

This discovery provides basis for a practical process for concentrating a dilute solution of hydrogen iodide and iodine in water. It its broad aspect, this process comprises passing a dilute solution of hydrogen iodide, iodine and water into an intermediate part of a rectification zone wherein there is maintained, by the addition of a water-soluble iodide, an iodide ion concentration of at least about 15% by weight, on an iodine-free basis, in the liquid material in the part of said zone above the point at which the feed enters it, recovering substantially pure water as overhead product and a concentrated solution of hydrogen iodide and iodine in water as bottoms product.

Our new method is applicable to the resolution of any solution of hydrogen iodide and iodine in water in which the concentration of hydrogen iodide does not exceed the concentration of hydrogen iodide in the constant-boiling mixture of hydrogen iodide and water at the conditions used. Thus, at ordinary pressures, for example, the concentration of hydrogen iodide in the mixture cannot exceed about 57.3% by weight, which is the concentration of hydrogen iodide in the constant-boiling hydrogen iodide-water mixture at about one atmosphere pressure. The concentration of hydrogen iodide in the constant-boiling hydrogen iodide-water mixture rises slightly as the pressure is reduced, being about 58.0% by weight at about 6.5 pounds per square inch absolute pressure and falls slightly with increase in pressure, being about 55.2% by weight at about 45 pounds per square inch, and about 54.4% by weight at about 65 pounds per square inch absolute pressure. Suitable solutions may contain any amount of iodine. Thus, solutions of hydrogen iodide in water containing 1% by weight of iodine, or even less, may be used. On the other hand, solutions of hydrogen iodide in water which are saturated with iodine are also quite suitable.

The essence of this invention lies in the provision of a concentration of iodide ion of at least about 15% by weight (iodine-free basis) in the liquid material in the part of the rectification zone above the point at which the feed enters it—a part of the rectification zone in which no substantial amount of iodide ion is present due to rectification of the feed solution. It is the presence of this concentration of iodide ion in this particular part of the rectification zone which prevents iodine from passing up through the zone without preventing the upward passage of the water vapors, thus enabling recovery of pure water as the overhead product. The concentration of iodide ion in this part of the rectification zone must be at least 15% by weight, on an iodine-free basis, because at lower iodide ion concentrations, the iodine becomes more volatile than water, and iodine would pass overhead, resulting in incomplete separation of the iodine and the water.

Suitable as the source of the iodide ion is any compound which will provide the necessary concentration of iodide ion in aqueous solution. Thus, alkali metal iodides, such as sodium and potassium iodides and alkaline earth metal iodides, such as calcium iodide, are suitable, as are other metal iodides, providing they are water-soluble and give at least 15% by weight of iodide ion in aqueous solution. Not suitable are metal iodides which tend to form complex compounds in which the metal is present as a part of the anion. The metal of the iodide used must necessarily be chemically inert in aqueous solutions of hydrogen iodide and iodine. The necessary concentration of iodide ion in the rectification zone can be provided by introduction of the solid metal iodide into the zone at an appropriate point. Preferably, however, an aqueous solution of the metal iodide is used as the source of the added iodide ion.

While an iodide ion concentration as small as 15% by weight (iodine-free basis) is effective in suppressing the passage of iodine vapors upward through the rectification zone, somewhat higher iodide ion concentrations are more effective for this purpose and are preferred. Thus, the iodide ion concentration in the rectification zone above the point at which the feed enters—that is, the added iodide ion concentration—preferably is of the order of from about 30% to about 60% by weight, on an iodine-free basis. The desired iodide ion concentration is maintained by correlating the amount of metal iodide and the amount of feed mixture passed to the rectification zone, and the amount of water added with the metal iodide and/or the amount of overhead product water returned to the rectification zone as reflux.

Hydrogen iodide also has been found to be suitable as the source of the added iodide ion, and for several reasons, which will become evident in the following description of details of the process of this invention, hydrogen iodide is preferred to metal iodides as the source of the added iodide ion. The following description will be specifically directed to the preferred aspect of the invention wherein hydrogen iodide is used as the source of the added iodide ion. However, it should be noted that this description is equally applicable to the process of the invention wherein a metal iodide is used as the source of the added iodide ion, taking into account the physical differences—primarily differences in vapor pressure and solubility—between metal iodides and hydrogen iodide in the mixtures of water, hydrogen iodide, iodine and metal iodides encountered in the practice of this invention.

A primary reason for preferring hydrogen iodide as the source of the added iodide ion is the fact that the use of hydrogen iodide for this purpose introduces no problem of the presence of, and the ultimate recovery of, an ion other than the iodide ion, as does the use of a metal iodide for this purpose.

However, hydrogen iodide solutions have a substantial partial pressure of hydrogen iodide, and when hydrogen iodide is used as the source of the added iodide ion, provision must be made to prevent hydrogen iodide from passing upwardly through the rectification zone above the point in that zone at which the added hydrogen iodide is introduced, and contaminating the overhead product water. This is most conveniently accomplished by providing in the rectification zone at a point above the point at which the added hydrogen iodide enters that zone, a sub-zone in which the upwardly flowing vapors are scrubbed with water to remove any hydrogen iodide present therein. Where a single distillation column is used as the rectification zone, the water used in this scrubbing zone is most conveniently provided by returning a part of the overhead product water as reflux to the scrubbing zone.

In the preferred aspect of our invention, therefore, a solution of hydrogen iodide and iodine in water is fed to an intermediate section of a rectification zone in which the bottoms product is reboiled and part of the overhead product is returned as reflux and in which there is maintained, by addition of hydrogen iodide, an iodide ion concentration of at least 15% by weight (iodine-free basis) in the liquid material in that part of said zone lying above the point at which the feed enters said zone, and a point below the point at which the reflux enters said zone, recovering substantially pure water as overhead product and a concentrated solution of hydrogen iodide, water and iodine as the bottoms product.

The separation of water from a dilute solution of hydrogen iodide and iodine in water thus may be considered to occur in three stages, involving three rectification zones. In the first of these zones, iodine and water vapors pass upwardly and a liquid mixture of hydrogen iodide, water and iodine passes downwardly in the zone from the point at which the feed mixture enters. The vapors from the first zone then pass into the second zone, wherein the rectification continues, an iodide ion concentration of at least 15% by weight on an iodine-free basis being maintained by means of added hydrogen iodide in the liquid phase in this second zone. In this second zone, the iodine is forced back into the liquid phase, the liquid phase (containing the added hydrogen iodide) is returned as reflux to the first zone, and the vapors from the second zone, mostly water vapor, with perhaps some hydrogen iodide vapor, are passed to the third zone. In this third zone, the rectification continues, substantially pure water being used as the reflux. In this zone, hydrogen iodide is forced back into the liquid phase, the liquid phase is returned as reflux to the second zone, and the vapors, consisting of essentially pure water, are vented or condensed for further use, including return of a part of the condensate as reflux to the third zone. The bottoms product of the first zone is a concentrated solution of hydrogen iodide, water and iodine.

Thus, the process of this invention may also be considered to comprise, in its preferred aspect, passing a dilute solution of hydrogen iodide, water and iodine as feed to an intermediate section of a first rectification zone, passing the vapors from said first zone to a second rectification zone wherein there is maintained by the addition of hydrogen iodide a concentration of iodide ion of at least 15% by weight on an iodine-free basis in the liquid phase therein, passing the liquid material from the bottom of said second zone as reflux to said first zone, passing the vapors from said second zone to a third rectification zone wherein there is added as reflux substantially pure liquid water, passing the liquid material from the bottom of said third zone as reflux to said second zone, venting or condensing the vapors from said third zone, consisting of substantially pure water, if desired passing a part of the condensate from said third zone as reflux to said third zone, and recovering the liquid from said first zone, consisting of a concentrated solution of hydrogen iodide and iodine in the remaining water, as product.

Either anhydrous hydrogen iodide, or an aqueous solution of hydrogen iodide can be used as the source of the added iodide ion. The amount of hydrogen iodide added must be sufficient to provide an iodide ion concentration of at least 15% by weight on an iodine-free basis in the part of the rectification zone above the point at which the feed enters. (It should be noted that, since the molecular weight of hydrogen iodide is almost the same as the atomic weight of iodine, for most purposes, and as herein intended, a specified concentration of iodide ion is provided by that same concentration of hydrogen iodide.) However, the concentration of hydrogen iodide in the rectification zone should not exceed the concentration of hydrogen iodide in a constant-boiling hydrogen iodide-water mixture under the conditions used in the rectification zone, for if the concentration of hydrogen iodide exceeds this value, an undue load will be placed on the hydrogen iodide-stripping zone. The hydrogen iodide concentration desirably is of the order of from about 30% to about 50%, and preferably is about 40% (i. e., from about 35% to about 45%) by weight on an iodine-free basis. At this hydrogen iodide concentration level, hydrogen iodide is easily prevented from passing upward in the rectification zone, the hydrogen iodide solution has maximum capacity for dissolving iodine, and the relative volatility of iodine to water is most favorable for preventing upward passage of the iodine in the rectification zone without interference with the upward passage of the water.

To effect complete separation of the iodine from the water, a certain amount of liquid must flow down in the rectification zone from the point therein at which the hydrogen iodide and reflux water mix. As a general rule, the ratio between the number of moles of liquid which must pass down from this point and the number of moles of vapor which pass up from this point—that is, the minimum reflux ratio—is equal to the relative volatility of iodine with respect to water at the concentration of hydrogen iodide present at that point. The relationship between the concentration of hydrogen iodide (expressed as the percent by weight of hydrogen iodide on an iodine-free basis) and the relative volatility of iodine with respect to water at substantially atmospheric pressure is as follows:

| Concentration of hydrogen iodide | Relative volatility, iodine/water |
|---|---|
| 15% | 1.0 |
| 20% | .72 |
| 25% | .48 |
| 30% | .36 |
| 35% | .28 |
| 40% | .23 |
| 45% | .22 |
| 50% | .23 |

Thus, where a 40% by weight hydrogen iodide concentration (iodine-free basis) is to be maintained, there must be about one mole of liquid flowing down for every four moles of vapor flowing up from the point in the rectification zone at which the added hydrogen iodide mixes with the reflux water.

Where anhydrous hydrogen iodide is used to provide the necessary hydrogen iodide concentration in the rectification zone, the liquid water must be furnished by the reflux. Where, however, an aqueous solution of hydrogen iodide is used as the source of the hydrogen iodide, at least a part of the necessary liquid water is provided by the water in this solution, the remainder coming from the reflux.

When the rectification of dilute solutions of hydrogen iodide and iodine in water is carried out in this manner, the overhead product is substantially pure water, containing no significant amount of either hydrogen iodide or iodine, and the bottoms product is a mixture of the hydrogen iodide contained in the feed, and that added, together with the iodine and the remaining water. It is normally most convenient to conduct the rectification under such conditions that the bottoms product comprises a constant-boiling mixture of the hydrogen iodide and the water, containing the iodine.

The rectification can be carried out at any convenient pressure. It has been found that liquid iodine is completely miscible with solutions of hydrogen iodide in water in which the hydrogen iodide concentration is at or near the concentration of hydrogen iodide in a constant-boiling hydrogen iodide-water mixture, and that liquid iodine is but incompletely miscible with more dilute hydrogen iodide-water solutions. Further, it also has been found that solid iodine is of but limited solubility in hydrogen iodide-water solutions even though the hydrogen iodide ion concentration therein is at or near the hydrogen iodide concentration in the constant-boiling hydrogen iodide-water mixture. Consequently, if a mixture of hydrogen iodide, iodine and water is cooled below the freezing point of iodine, a solid iodine phase will form if the amount of iodine is in excess of the amount of solid iodine which will dissolve in the particular hydrogen iodide-water solution involved. It is essential in the rectification, and desirable in the recovery of the bottoms product, that the iodine be maintained in the liquid phase. Consequently, it normally will be found most feasible, and most convenient, to conduct the rectification at a pressure of about one atmosphere absolute. At atmospheric pressure, the boiling point of the constant-boiling hydrogen iodide-water mixture is 127° C., while the melting point of iodine is but 114° C., so that solidification of the iodine is not likely to occur under these conditions. In some cases, it may be found desirable to use slightly elevated pressures to further ensure that the iodine will not solidify. Pressures in excess of about 3 or 4 atmospheres absolute offer little advantage over lower pressures.

In many cases, as where the iodine concentration in the feed solution is low, the iodine will be completely soluble in the hydrogen iodide-water solutions used, and no problem of maintaining the iodine in the liquid phase will exist. In these cases, operation at pressures of less than one atmosphere absolute often will be found to be desirable and to lead to substantial advantage, for operation at reduced pressures permits conduct of the rectification at lower temperatures. Since hydrogen iodide-iodine-water mixtures are quite corrosive, and the corrosivity of such mixtures increases markedly with increase in temperature, use of low operating temperatures permits the use of many materials of construction which cannot be used at the higher operating temperatures. Where the amount of iodine exceeds the amount which will dissolve in the hydrogen iodide-water solutions involved, a separate phase of iodine will form. In these cases, of course, it will be necessary to use higher pressures to obtain the temperatures required to maintain this separate phase of iodine in the liquid state.

The temperatures involved in the rectification will, of course, be fixed by the pressure used and by the compositions of the various mixtures involved in the rectification.

We have also found that concentrated solutions of hydrogen iodide and iodine in water can be separated by simple rectification into a solution of hydrogen iodide in water (as overhead product) and iodine (as bottoms product). Thus, simple rectification of a solution of hydrogen iodide and iodine in water in which the concentration of hydrogen iodide is substantially the concentration of hydrogen iodide in a constant-boiling hydrogen iodide-water mixture is separated by rectification into a constant-boiling hydrogen iodide-water mixture as overhead product and substantially pure iodine as bottoms product.

The rectification of such concentrated solutions of hydrogen iodide and iodine in water is conducted in the usual manner. Since the apparent relative volatility of the constant-boiling hydrogen iodide-water mixture with respect to iodine, considering the system as a two component system, is about 3.3, the minimum reflux ratio is the reciprocal of 3.3 or about 0.33, indicating that about one mole of the constant-boiling mixture must be returned as liquid reflux for every three moles of the constant-boiling mixture passing upward from the top of the rectification zone as vapor. The rectification may be carried out at any convenient pressure. The various considerations which govern the selection of a suitable operating pressure are those set out hereinbefore with respect to the separation of water from the dilute hydrogen iodide-iodine-water solutions.

As will be set out in detail hereinafter, in some cases, it is desirable that pure iodine not be recovered. In such cases, it often is desirable to take overhead only enough constant-boiling hydrogen iodide-water mixture to provide the necessary added hydrogen iodide in the water-removal rectification; in these cases, the bottoms product is a mixture of the remaining constant-boiling mixture and the iodine. Again, the various considerations which govern the selection of a suitable operating pressure are those set out hereinbefore with respect to the separation of water from the dilute hydrogen iodide-iodine-water solutions.

In passing, it should be noted that we have found that the composition of the vapors in equilibrium with a constant-boiling mixture of hydrogen iodide and water differs but slightly from the composition of the vapors in equilibrium with the same constant-boiling mixture of hydrogen iodide and water in which there has been dissolved a substantial amount of iodine.

It will be immediately evident that our discoveries provide a simple, effective process for resolving dilute solutions of hydrogen iodide and iodine in water, to give as products pure water, pure iodine and a concentrated solution of hydrogen iodide in water. (This solution is of optimum value as the starting material in processes for the conversion of hydrogen iodide in aqueous solution to iodine.) In its broad aspect, this process comprises passing a solution of hydrogen iodide and iodine in water to an intermediate section of a first rectification zone in which the bottoms product is reboiled and a part of the overhead product is returned as reflux and in which there is maintained, by addition of hydrogen iodide, a hydrogen iodide concentration of at least 15% by weight (iodine-free basis) in the liquid material in that part of said zone lying above the point at which the feed enters said zone, and a point below the point at which the reflux enters said zone, recovering substantially pure water as overhead product, passing the bottoms product from said zone, comprising a concentrated solution of hydrogen iodide and iodine in water, to an intermediate section of a second rectification zone, wherein the bottoms product is fractionally distilled to give a constant-boiling mixture of hydrogen iodide and water as overhead product and iodine, together with from none to a substantial amount less than the amount present in the feed to said second zone, of each of hydrogen iodide and water as bottoms product and passing at least a part of said overhead product to said first rectification zone to provide the hydrogen iodide added to said first rectification zone.

Stated in another way, our process comprises passing a dilute solution of hydrogen iodide, iodine and water into an intermediate section of a first rectification zone, passing the vapors from said first zone to a second rectification zone wherein there is maintained by the addition of hydrogen iodide a concentration of iodide ion of at least 15% by weight on an iodine-free basis in the liquid phase therein, passing the liquid material from the bottom of said second zone as reflux to said first zone, passing the vapors from said second zone to a third rectification zone wherein there is added as reflux substantially pure liquid water, passing the liquid material from the bottom of said third zone as reflux to said second zone, venting or condensing the vapors from said third zone, consisting of substantially pure water, if desired passing a part of the condensate from said third zone as reflux to said third zone, passing the liquid material from the bottom of said first zone as feed to the intermediate section of a fourth rectification zone, passing the vapors from said fourth zone to a condenser, returning a part of said condensate as reflux to said fourth zone, passing at least a part of said condensate to the liquid passing from the bottom of said third zone as reflux to said second zone, recovering any remaining part of said condensate, consisting of a constant-boiling mixture of hydrogen iodide and water, as product, recovering the liquid material from the bottom of said fourth zone, consisting of iodine, together with from none to a substantial amount less than the amount present in the feed to said fourth rectification zone, of each of hydrogen iodide and water, as product.

When the water removal step is conducted in the preferred manner, the bottoms product is a constant-boiling mixture of hydrogen iodide and water containing the iodine, so that the bottoms product of the iodine recovery step iodine, together with from none to a substantial amount of the constant-boiling hydrogen iodide-water mixture.

If it is desired to obtain pure iodine as bottoms product, the iodine recovery step is so conducted that all of the constant-boiling hydrogen iodide-water mixture is recovered overhead.

Where it is desired to merely concentrate the dilute solution of hydrogen iodide and iodine in water, and not to recover the iodine as such, our discoveries also provide an advantageous and efficient process. In this process, the amount of the constant-boiling hydrogen iodide-water mixture taken from the top of the second rectification zone is just sufficient to provide the necessary hydrogen iodide added to the first rectification zone. The bottoms product from the second zone is then a solution comprising a concentrated mixture of hydrogen iodide, water and iodine.

The foregoing constitutes a general description of our invention. The invention is further described and illustrated by the following specific embodiments thereof. These embodiments are intended to be illustrative in nature only and are not to be construed as restricting the invention in any way not specified in the claims of this application. In these embodiments, unless otherwise stated therein, the term "parts" means parts by weight.

EXAMPLE I

Several solutions of hydrogen iodide and iodine in water were distilled in an Oldershaw column containing 36 actual plates. The feed mixture was introduced on the fourth plate above the reboiler and an essentially constant-boiling mixture of hydrogen iodide and water containing 56.5% by weight hydrogen iodide and 43.5% by weight water was introduced on the 28th plate above the reboiler. The reflux ratio and the rate at which the hydrogen iodide-water mixture was added were so adjusted in every case so as to maintain the concentration of hydrogen iodide in the liquid on the 28th plate at a level between 30% and 40% by weight on an iodine-free basis. Details of the experiments and the results thereof are set out in the following table:

*Table I*

| Run No. | Feed Composition (percent by weight) | | | Feed rate (parts/hour) | Overhead Flow Rate (parts/hour) | Reflux Ratio [1] | CBM-Overhead Ratio (part/part) | HI concentration, 28th plate (percent by weight, I₂-free basis) | Overhead Composition (percent by weight) | | | Bottoms Composition (percent by weight) | | | HI concentration in bottoms (percent by weight, I₂-free basis) |
|---|---|---|---|---|---|---|---|---|---|---|---|---|---|---|---|
| | $I_2$ | $H_2O$ | HI | | | | | | $I_2$ | $H_2O$ | HI | $I_2$ | $H_2O$ | HI | |
| 1 | 36 | 33 | 31 | 3,700 | 340 | 0.25 | 0.68 | 43 | [2] 0.0 | 100.0 | trace [3] | 36 | 29 | 35 | 55 |
| 2 | 31 | 38 | 31 | 3,300 | 620 | 0.25 | 0.46 | 37 | 0.0 | 100.0 | ---do--- | 33 | 29 | 38 | 57 |
| 3 | 31 | 38 | 31 | 1,900 | 440 | 0.36 | 0.69 | 39 | 0.0 | 100.0 | ---do--- | 31 | 29 | 40 | 57 |
| 4 | 31 | 38 | 31 | 1,800 | 490 | 0.49 | 0.93 | 37 | 0.0 | 100.0 | ---do--- | 28 | 32 | 40 | 56 |
| 5 | 31 | 38 | 31 | 2,100 | 570 | 0.51 | 1.12 | 39 | 0.0 | 100.0 | ---do--- | 24 | 33 | 43 | 57 |
| 6 | 31 | 38 | 31 | 1,400 | 510 | 0.59 | 1.23 | 38 | 0.0 | 100.0 | ---do--- | 24 | 33 | 43 | 57 |
| 7 | 32 | 50 | 18 | 2,600 | 760 | 0.46 | 0.56 | 32 | 0.0 | 100.0 | ---do--- | 30 | 41 | 29 | 41 |
| 8 | 32 | 50 | 18 | 2,700 | 760 | 0.46 | 0.84 | 37 | 0.0 | 100.0 | ---do--- | 32 | 41 | 27 | 40 |
| 9 | 32 | 50 | 18 | 2,700 | 770 | 0.46 | 1.21 | 41 | 0.0 | 100.0 | ---do--- | 30 | 45 | 25 | 35 |

[1] Moles liquid returned per mole of vapor overhead.
[2] No iodine was detectable in the overhead product in any of the experimental runs.
[3] A trace of hydrogen iodide was found in the overhead product in each case, due to entrainment of the hydrogen iodide in the vapors passing overhead.

EXAMPLE II

To demonstrate the effectiveness of the process of the invention in preventing passage of iodine overhead with the water, certain of the experimental runs set out in Example I were repeated, using the same distillation column and operating conditions. The only change was that no hydrogen iodide solution was added to the column. The following results were obtained:

*Table II*

| Run No. | Feed Composition (Percent by weight) | | | Corresponding Run No. of Example I | Overhead Composition (Percent by weight) | | |
|---|---|---|---|---|---|---|---|
| | $I_2$ | $H_2O$ | HI | | $I_2$ | $H_2O$ | HI |
| 1 | 36 | 33 | 31 | 1 | 13.5 | 86.5 | trace |
| 2 | 32 | 50 | 18 | 7-9 | 25.7 | 74.3 | Do. |

It is thus evident that the process of the invention is of outstanding effectiveness in effecting separation of iodine and water in the distillation of dilute solutions of hydrogen iodide and iodine in water.

EXAMPLE III

The following is a typical embodiment of the aspect of the process of the invention wherein a mixture of a constant-boiling solution of hydrogen iodide containing dissolved iodine is distilled to separate the constant-boiling mixture of hydrogen iodide and water overhead and pure iodine as bottoms product.

A liquid mixture having the composition: 26.4% w. hydrogen iodide, 21.2% w. water and 52.4% w. iodine, is distilled in a grid tray column containing 34 trays. The feed is introduced on the 18th tray above the reboiler, at the rate of 345 parts per hour. The column is operated at about 60 pounds per square inch absolute pressure. 272 parts per hour of a mixture of 55.3% w. hydrogen iodide, 44.7% w. water and 0.3% w. iodine wass overhead. 108 parts per hour of the mixture are returned to the top of the column as reflux, the remainder being recovered as overhead product. 181 parts per hour of substantially pure iodine are recovered as bottoms product.

Although the process of the invention is applicable to mixtures of iodine, hydrogen iodide and water obtained from any source, the process is of particular applicability to the mixtures of iodine, hydrogen iodide and water obtained from processes in which iodine is used as a reactant. For example, it has been recently discovered that elemental iodine is useful for modifying the carbon-to-carbon structure of various organic materials, particularly hydrocarbons. In this use, iodine acts as a dehydrogenating agent, removing one or more hydrogen atoms from one or more carbon atoms of the material treated; one molecule of hydrogen iodide is formed per atom of hydrogen removed. The inorganic portions of the final reaction mixtures resulting from such processes normally comprise hydrogen iodide, together with substantial amounts of elemental iodine (that unreacted in the process) and water. Water normally is present because the hydrogen iodide and iodine are conveniently recovered from the effluent from the reaction zone of these processes by scrubbing that effluent with water or a dilute aqueous solution of hydrogen iodide. Also, where the product of the dehydrogenation is highly reactive, water or steam is added to the effluent to substantially reduce the temperature of the effluent, and/or to dilute it, thus reducing side reactions between the reaction product and either or both of the iodine and hydrogen iodide. The expense of iodine requires recovery of even very small amounts of the element. The process of the present invention provides an operationally simple, efficient process for recovering the elemental iodine content of such reaction mixtures. The new process also is of value for effecting recovery of elemental iodine from the reaction mixture obtained from the liquid-phase methods used in conjunction with these dehydrogenation processes for converting the hydrogen iodide to elemental iodine. In such methods, the conversion of hydrogen iodide to iodine usually is limited by chemical equilibrium and/or reaction rate considerations to substantially less than 100%, so that recovery of iodine from iodine-water-hydrogen iodide mixtures is essential to the practical operability of such methods.

We claim as our invention:

1. A process for recovering water from a dilute solution of hydrogen iodide and iodine in water comprising passing said solution into an intermediate part of a rectification zone wherein there is maintained an iodide ion concentration of at least about 15% by weight on an iodine-free basis in the liquid material in the part of said zone above the point at which the said solution enters it, recovering substantially pure water as overhead product and a concentrated solution of hydrogen iodide and iodine in water as bottoms product.

2. The process of claim 1 wherein the said iodide ion concentration is maintained by the addition of a water-soluble iodide.

3. The process of claim 1 wherein the said iodide ion concentration is maintained by the addition of hydrogen iodide.

4. A process for recovering water from a dilute solution of hydrogen iodide and iodine in water comprising passing said solution into an intermediate part of a rectification zone in which the bottoms product is reboiled and part of the overhead product is returned as liquid reflux and in which there is maintained, by addition of hydrogen iodide, an iodide ion concentration of at least 15% by weight on an iodine-free basis in the liquid material in that part of said zone lying above the point at which said solution enters said zone and a point below the point at which the reflux enters said zone, recovering substantially pure water as overhead product and a concentrated solution of hydrogen iodide, water and iodine as bottoms product.

5. A process for recovering water from a dilute solution of hydrogen iodide, iodine and water comprising passing said solution into an intermediate section of a first rectification zone, passing the vapors from said first rectification zone to a second rectification zone wherein there is maintained in the liquid phase a mixture of water and hydrogen iodide in which the concentration of hydrogen iodide is at least 15% by weight on an iodine-free basis, passing the liquid material from the bottom of said second rectification zone as reflux to said first rectification zone, passing the vapors from said second rectification zone to a third rectification zone wherein there is used as reflux substantially pure liquid water, passing the liquid material from said third rectification zone as reflux to said second rectification zone, recovering the vaporous material from said third rectification zone to give substantially pure water as overhead product, and recovering as bottoms product the liquid material from the bottom of said first rectification zone, said liquid material comprising a concentrated solution of hydrogen iodide and iodine in water.

6. The process according to claim 5 wherein the liquid mixture of hydrogen iodide and water required in said second rectification zone is maintained by the addition of a liquid constant-boiling mixture of hydrogen iodide and water to the liquid passing from the bottom of said third rectification zone as reflux to said second rectification zone.

7. A process for recovering water from a dilute solution of hydrogen iodide and iodine in water comprising passing said mixture as feed to an intermediate section of a fractionating column wherein the vaporous material passed overhead is condensed and a part of the condensate is returned as reflux to a point in the upper section of said column and the liquid material passing to the bottom of said column is reboiled, fractionally distilling said mixture in said column, maintaining a hydrogen iodide concentration of at least 15% by weight on an iodine-free basis, but not exceeding the concentration of hydrogen iodide in a constant-boiling mixture of hydrogen iodide and water, in the section of said column above the point at which said feed is passed into said column and below the point at which said reflux is passed into said column, recovering substantially pure water as overhead product and a concentrated solution of hydrogen iodide and iodine in water as bottoms product.

8. The process according to claim 7 wherein the said hydrogen iodide concentration is maintained by passing into said column a liquid constant-boiling mixture of hydrogen iodide and water.

9. A process for recovering water from a dilute solution of hydrogen iodide and iodine in water comprising passing said mixture as feed to an intermediate section of a fractionating column wherein the vaporous material passed overhead is condensed and a part of the condensate is returned as reflux to a point in the upper section of said column and the liquid material passing to the bottom of said column is reboiled, fractionally distilling said mixture in said column, maintaining a hydrogen iodide concentration of from about 30% to about 50% by weight on an iodine-free basis in the section of said column above the point at which said feed is passed into said column and below the point at which said reflux is passed into said column, said hydrogen iodide concentration being effected by passing into said column a liquid constant-boiling mixture of hydrogen iodide and water, recovering substantially pure water as overhead product and a concentrated solution of hydrogen iodide and iodine in water as bottoms product.

10. A process for resolving a concentrated solution of hydrogen iodide and iodine in water comprising rectifying said solution to recover a constant-boiling mixture of hydrogen iodide and water as overhead product and substantially pure iodine as bottoms product.

11. A process for resolving a dilute solution of hydrogen iodide and iodine in water comprising passing said solution to an intermediate section of a first rectification zone in which the bottoms product is reboiled and a part of the overhead product is returned as liquid reflux and in which there is maintained by addition of hydrogen iodide, a hydrogen iodide concentration of at least about 15% by weight on an iodine-free basis in the liquid material in that part of said zone lying above the point at which the solution enters said zone and a point below the point at which the reflux enters said zone, recovering substantially pure water as overhead product, passing the bottoms product from said first zone, comprising a concentrated solution of hydrogen iodide and iodine in water, to an intermediate section of a second rectification zone, wherein the bottoms product is fractionally distilled to give as overhead product a constant-boiling mixture of hydrogen iodide and water, and iodine, together with from none to a substantial amount less than the amount present in the feed to said second zone, of each of hydrogen iodide and water, passing at least a part of said overhead product as a liquid to said first rectification zone to provide the necessary hydrogen iodide added to said first rectification zone.

12. The process according to claim 11 wherein the bottoms product from the first rectification zone is a constant-boiling mixture of hydrogen iodide and water containing the iodine.

13. The process according to claim 12 wherein substantially pure iodine is recovered as bottoms product of the second rectification zone.

14. The process according to claim 11 wherein the amount of constant-boiling hydrogen iodide-water mixture taken overhead from said second rectification zone and passed to said first rectification zone is just sufficient to provide the necessary added hydrogen iodide.

15. A process for resolving a dilute solution of hydrogen iodide and iodine in water comprising passing said solution to an intermediate section of a first rectification zone, passing the vapors from said first zone to a second rectification zone wherein there is maintained by the addition of hydrogen iodide a concentration of iodide ion of at least 15% by weight on an iodine-free basis in the liquid phase therein, passing the liquid material from the bottom of said second zone as reflux to said first zone, passing the vapors from said second zone to a third rectification zone wherein there is added as reflux substantially pure liquid water, passing the liquid material from the bottom of said third zone as reflux to said second zone, recovering the vapors from said third zone, consisting of substantially pure water, as product, passing the liquid material from the bottom of said first zone as feed to the intermediate section of a fourth rectification zone, passing the vapors from said fourth zone to a condenser, returning at least a part of said condensate to the liquid passing from the bottom of said third zone as reflux to said second zone to maintain the hereinbefore specified hydrogen iodide concentration in said second zone, recovering any remaining part of said condensate, consisting of a constant-boiling mixture of hydrogen iodide and water, as product, recovering the liquid material from the bottom of said fourth zone, consisting of iodine, together with from none to a substantial amount less than the amount present in the feed to said fourth rectification zone of each of hydrogen iodide and water, as product.

16. The process according to claim 15 wherein the bottoms product from the first rectification zone is a constant-boiling mixture of hydrogen iodide and water containing the iodine.

17. The process according to claim 16 wherein the amount of the condensate obtained from the overhead product of the fourth zone and passed to the liquid passing from the third zone as reflux to the second zone is just sufficient to provide the necessary added hydrogen iodide.

18. The process according to claim 15 wherein substantially pure iodide is recovered as the bottoms product of the fourth zone.

No references cited.